United States Patent
Keohane et al.

(10) Patent No.: US 8,424,067 B2
(45) Date of Patent: Apr. 16, 2013

(54) SMART PASSWORD DETERMINATION

(75) Inventors: Susann Marie Keohane, Austin, TX (US); Gerald Francis McBrearty, Austin, TX (US); Shawn Patrick Mullen, Buda, TX (US); Jessica Kelley Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1525 days.

(21) Appl. No.: 11/335,892

(22) Filed: Jan. 19, 2006

(65) Prior Publication Data

US 2007/0169178 A1    Jul. 19, 2007

(51) Int. Cl.
*G06F 7/04* (2006.01)

(52) U.S. Cl.
USPC ............... 726/6; 713/182; 713/183; 713/184; 726/2; 726/3; 726/4; 726/5

(58) Field of Classification Search ............ 726/6, 18
See application file for complete search history.

(56) References Cited

U.S. PATENT DOCUMENTS

| 5,606,663 | A  | * | 2/1997 | Kadooka ..................... 726/18 |
| 6,691,232 | B1 | * | 2/2004 | Wood et al. .................. 726/6 |
| 7,100,195 | B1 | * | 8/2006 | Underwood ................. 726/2 |
| 2004/0177272 | A1 | * | 9/2004 | Walters ...................... 713/201 |
| 2005/0149763 | A1 | * | 7/2005 | Nakao ......................... 713/202 |
| 2005/0160280 | A1 | * | 7/2005 | Caslin et al. ................ 713/189 |
| 2005/0198099 | A1 | * | 9/2005 | Motsinger et al. ........... 709/200 |

OTHER PUBLICATIONS

"AIX users password expiration tool", IBM disclosure, Dec. 2003, IPCOM000020684D, IP.com, pp. 1-2.

* cited by examiner

*Primary Examiner* — Ashok Patel
*Assistant Examiner* — Alexander Lagor
(74) *Attorney, Agent, or Firm* — Yee & Associates, P.C.

(57) ABSTRACT

A system and method for dynamically adjusting or modifying the password expiration period for a given user based upon how a user accesses the password-protected resource. The tighter the physical control of how a user can access a resource results in a loosening or maintaining of the password expiration period to be a relatively long period of time, whereas the looser the physical control of how a user can access a resource results in a tightening of the password expiration period to be a relatively short period of time. The password expiration period is adjusted based on both actual usage patterns as well as variances in such usage patterns.

20 Claims, 3 Drawing Sheets

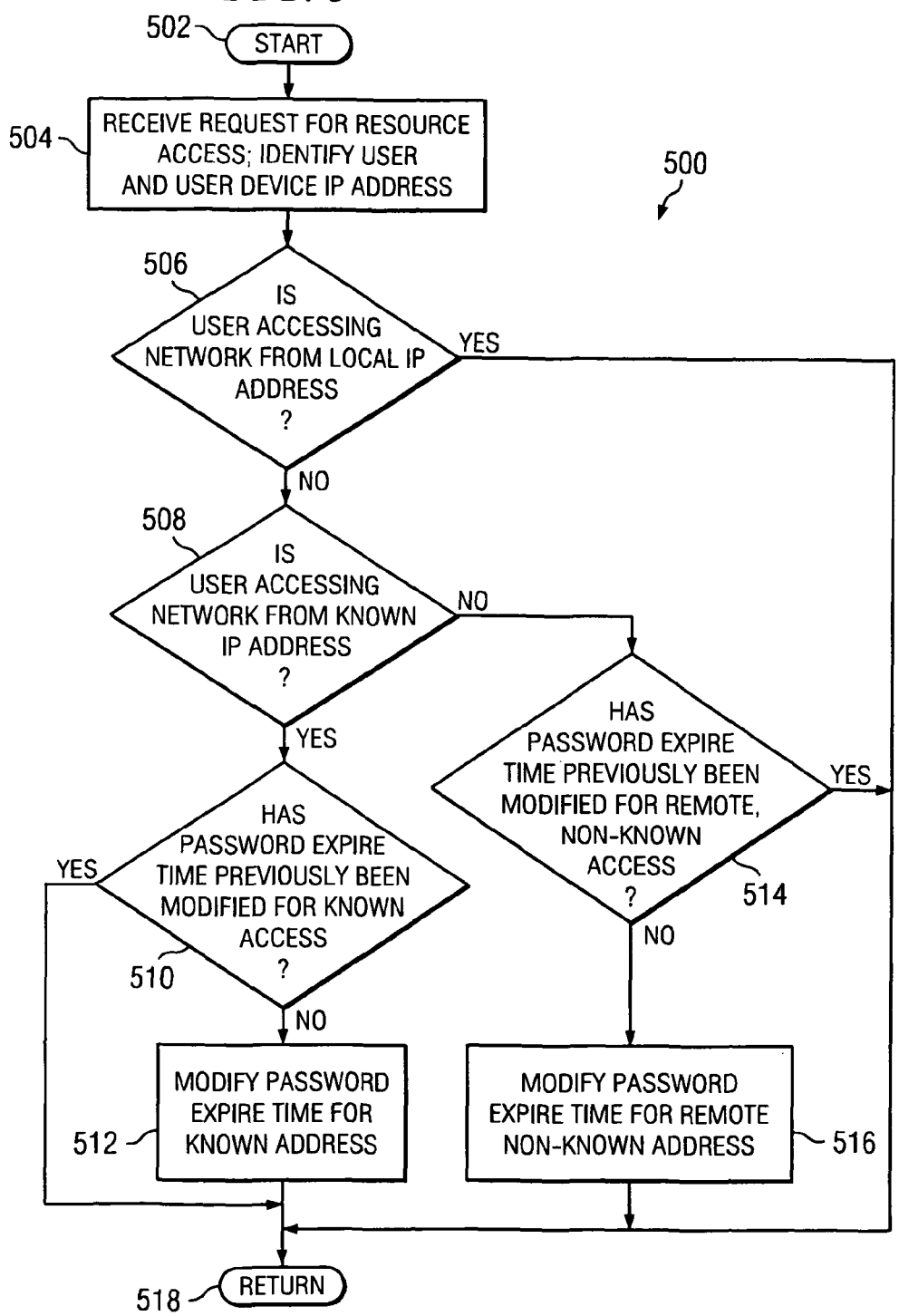

SMART PASSWORD DETERMINATION

BACKGROUND OF THE INVENTION

1. Field of the Invention

The present invention generally relates generally to security systems, and in particular relates to a method and system for dynamically adjusting a password expiration period based on access patterns of a user accessing a password-protected resource such as a data processing system.

2. Description of the Related Art

Many types of systems have security mechanisms in place that require a user of the system to provide a password in order to access resources of the system. Many of these systems also maintain an expiration time or count that is used to prompt a user to change their password when the expiration time/count occurs. For example, a user may be prompted to change their password after 30, 60 or 90 days from the last time the password was changed.

The location of a user, when accessing a system having a password security mechanism, is in many instances an indicator of how high a degree of risk there is that the security system/password may be compromised. For example, a user who only accesses their employers' computer system and resources within the confines of the employer's physical place of business generally has a lower risk of password compromise that a user who accesses their employers' computer system and resources from home using a telecommunication network to gain access. Similarly, a user who frequently accesses their employers' computer system on the road, such as a frequent business traveler who accesses their employers' computer system and resources from hotels, coffee shops, airports/airplanes, etc. generally has a higher risk of password compromise than either the at-home access or the place-of-business access.

Today's password expiration periods are arbitrarily set to a given period of time, typically by a system administrator, for an entire population of user's of the resource. It would be desirable to provide an automated password expiration method based on the connection and usage risk of a given user.

SUMMARY OF THE INVENTION

The present invention is directed to a system and method for dynamically adjusting or modifying the password expiration period for a given user based upon how a user accesses the password-protected resource. The tighter the physical control of how a user can access a resource results in a loosening or maintaining of the password expiration period to be a relatively long period of time, whereas the looser the physical control of how a user can access a resource results in a tightening of the password expiration period to be a relatively short period of time. The password expiration period is adjusted based on both actual usage patterns as well as variances in such usage patterns.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a flow diagram of a methodology for adaptive modification of a password expiration period based upon a user's network connect/usage patterns.

DETAILED DESCRIPTION OF THE PREFERRED EMBODIMENT

Figure 1:
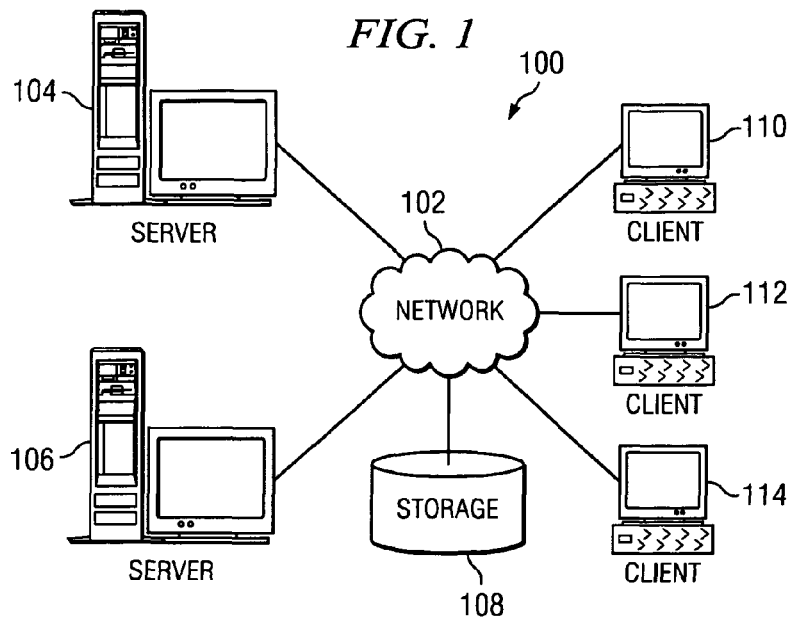
FIG. 1 is a pictorial representation of a data processing environment in which the present invention may be implemented.
Figure 2:
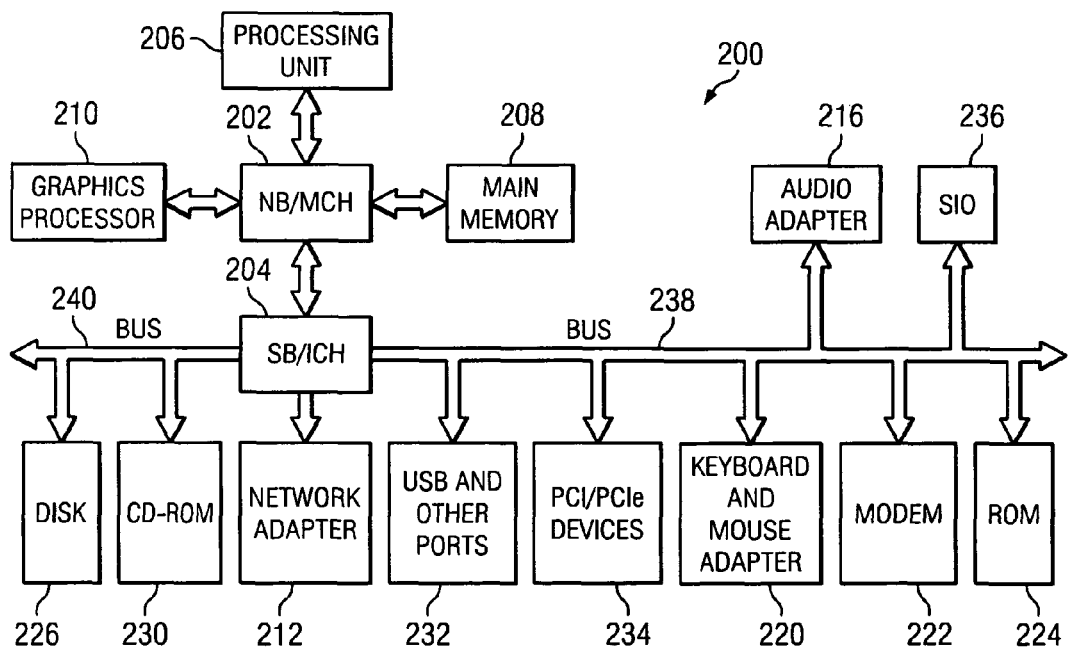
FIG. 2 is a pictorial representation of a data processing system in which the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A discussion of the details of an Internet Protocol (IP) address is now in order. In the most widely installed level of the Internet Protocol today, and as defined by Internet Protocol Version 4, an IP address is a 32-bit number that identifies each sender or receiver of information that is sent across the Internet. This information is sent in the form of data packets. When particular information is requested from the internet, such as requesting an HTML page from a server, or when particular information is sent onto the internet, such as sending an e-mail, the Internet Protocol part of TCP/IP includes the originator's IP address in the message, which is included in each of the packets if more than one is required, and the request for information or the sending of information is sent to a particular IP address. This IP address is obtained by looking up the domain name for the logical name (a.k.a. Uniform Resource Locator or URL) that was requested or in the e-mail address that a note was sent to. An example of such logical name or URL is www.ibm.com, which is used to avoid having to remember long strings of numbers which are meaningless to most users. The 'looked-up' IP address would be an address of the form 129.42.16.99. An IP address has two parts: the identifier of a particular network on the Internet and an identifier of the particular device (which can be a server or a workstation) within that network. The Internet is really an interconnection of many different individual networks, and the Internet Protocol (IP) is basically the set of rules for one network communicating with any other network. Each network must know its own address on the Internet and that of any other networks with which it communicates. To be part of the Internet, an organization needs an Internet network number. This unique network number is included in any packet sent out of the network onto the Internet, and is the network address portion of the IP address.

In addition to the network address or number, information is needed about which specific machine or host in a network is sending or receiving a message. So the IP address needs both the unique network number and a host number which is unique within the network (the host number is sometimes called a local or machine address). Part of the local address can identify a subnetwork or subnet address, which makes it easier for a network that is divided into several physical subnetworks (for examples, several different local area networks) to handle many devices.

Since networks vary in size, there are four different address formats or classes to consider:
Class A addresses are for large networks with many devices; Class B addresses are for medium-sized networks. Class C addresses are for small networks (fewer than 256 devices); and Class D addresses are multicast addresses. The first few bits of each IP address indicate which of the address class formats it is using. The address structures look like this:
Class A
0 Network (7 bits) Local address (24 bits)
Class B
10 Network (14 bits) Local address (16 bits)
Class C
110 Network (21 bits) Local address (8 bits)
Class D
1110 Multicast address (28 bits)

The IP address is usually expressed as four decimal numbers, each representing eight bits, separated by periods. For Class A IP addresses, the numbers would represent "network.local.local.local"; for a Class C IP address, they would represent "network.network.network.local".

It should also be noted that the machine or physical address used within an organization's local area networks may be different than the Internet's IP address. The most typical example is the 48-bit Ethernet address. TCP/IP includes a facility called the Address Resolution Protocol (ARP) that lets the administrator create a table that maps IP addresses to physical addresses. The table is known as the ARP cache.

As can be appreciated, because of the explosive growth of the Internet, the number of available addresses is quickly being exhausted. In order to provide more available IP addresses, a new Internet Protocol Version 6 (IPv6) is being defined for newer 128-bit IP address.
The details of such new addressing scheme are not critical to the present invention, but it should be noted that the present invention is not limited to 32 bit versions of an IP address. Rather, what is needed by the present invention is a tool that allows for tracing the path a message traverses between two devices, such as a message sent by a client computing device to a host system. A utility program known as traceroute, or similar, tool is what is used herein to enable the tracing of a communication session between two devices using a public network for interconnection therebetween.

Traceroute is a utility that records the route (the specific gateway computers at each hop) through the Internet between a computing device and a specified destination device such as a computer server. This utility also calculates and displays the amount of time each hop took. The traceroute utility comes included with a number of operating systems, including Microsoft's Windows operating system and Unix-based operating systems (such as IBM's AIX/6000 or Linux) or as part of a TCP/IP package. There are also freeware versions that can be downloaded from the Internet.

When the traceroute command is issued, the utility initiates the sending of a packet (using the Internet Control Message Protocol or ICMP), including in the packet a time limit value (known as the "time to live" (TTL) that is designed to be exceeded by the first router that receives it, which will return a Time Exceeded message. This enables traceroute to determine the time required for the hop to the first router. Increasing the time limit value, it resends the packet so that it will reach the second router in the path to the destination, which returns another Time Exceeded message, and so forth. Traceroute determines when the packet has reached the destination by including a port number that is outside the normal range. When it's received, a Port Unreachable message is returned, enabling traceroute to measure the time length of the final hop. As the tracerouting progresses, the records are displayed hop by hop. Actually, each hop is measured multiple times (and an asterisk (*) indicates a hop that exceeded some limit or time-out value).

Now that basic IP addressing and the traceroute utility have been described, a representative traceroute trace will now be shown, where the network route between two points is shown. In this particular example, a route is listed from a source home computer connected to an Internet Service Provider, via high-speed cable modem, to the destination URL of www.usatoday.com. The network route that was determined by the traceroute tool is as follows:
Tracing route to www.usatoday.com [167.8.128.41] over a maximum of 30 hops:

| 1 | * | * | * | Request timed out. |
|---|---|---|---|---|
| 2 | * | * | * | Request timed out. |
| 3 | 12 ms | 14 ms | 11 ms | 68.86.105.145 |
| 4 | 12 ms | 14 ms | 13 ms | 68.86.103.65 |
| 5 | 13 ms | 13 ms | 11 ms | 68.86.103.117 |
| 6 | 23 ms | 37 ms | 24 ms | 68.86.103.17 |
| 7 | 14 ms | 17 ms | 15 ms | 68.86.103.138 |
| 8 | 36 ms | 14 ms | 13 ms | 12.124.158.17 |
| 9 | 38 ms | 44 ms | 36 ms | 12.123.36.138 |
| 10 | 36 ms | 35 ms | 41 ms | 12.122.1.37 |
| 11 | 36 ms | 37 ms | 34 ms | 12.122.10.97 |
| 12 | 35 ms | 35 ms | 33 ms | 12.123.142.21 |
| 13 | 33 ms | 34 ms | 36 ms | 12.127.141.26 |
| 14 | 37 ms | 35 ms | 40 ms | 204.155.172.35 |
| 15 | 37 ms | 36 ms | 35 ms | 167.8.128.41 |

Trace complete.

As can be seen in this example, the first two attempts to access the first 'hop' along the route timed out. Then, thirteen hops are listed, beginning at IP address 68.86.105.145 and ending at address 167.8.128.41.

A host or server system can similar perform the traceroute function to devices that it is in communication with, in order to determine the physical location of such devices. This information can then be used, as described further below, to determine where the accessing-device, and its associated user, is located. For example, a determination can be made if the user is connected to an internal or external network, with respect to the host or server system, and whether the accessing-device, and associated user, has connected to the host/server from the same location a number of times, which may be an indication that the user is connecting from a relatively safe location, such as a remote field office or home.

Many types of systems require a user to enter a password to obtain access to certain system resources. As a part of such password security mechanism, many security systems also require that a user periodically change their password to help mitigate certain types of password compromise, where a user's password is no longer secret to that user, but rather is known to another who could then use such password to masquerade as the user of the password and improperly access system resources. For example, such security systems may force a user to arbitrarily modify their password every thirty (30), sixty (60) or ninety (90) days. In certain types of situations, such as when a user is only accessing system resources in a physically secure environment with little risk of password compromise, such a mandatory password change can itself cause password compromise, as a user may begin to resort to writing their passwords done on paper due to the large number of, and associated frequent changing of, passwords they are required to remember. The present invention monitors a user's network usage when accessing system resources, in order to determine usage patterns, and adaptively modifies the time interval for forcing a user to modify their password based upon such detected network pattern usage and the associated risk.

Figure 3:
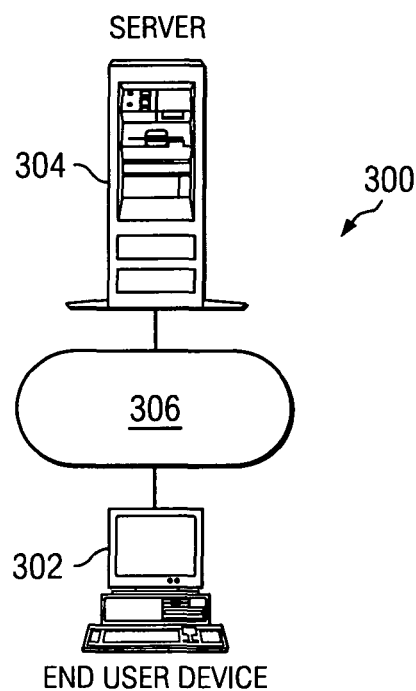
FIG. 3 depicts an environment where a user accesses computer resources from within the confines of an employer's physical place of business.

FIG. 3 shows an example of a user accessing computer resources from within the confines of his/her employer's physical place of business—which is a relatively secure environment. For example, the Traceroute utility would reveal that the source and destination address, as well as all routes in between, are contain within the protection of the corporate network. As shown at 300, an end user (not shown) operates an end user device 302 to access resources provided by server 304. A network 306, such as a local area network (LAN), is used to interconnect the user device 302 to the server 304, and since this LAN 306 is fully contained within the physical confines of the employer's physical place of business, this environment is relatively safe from malicious hacking into the network by would-be outside intruders. In this type of environment, the password expire period can be set to be a relatively long period of time with respect to other user-access environments.

Figure 4:
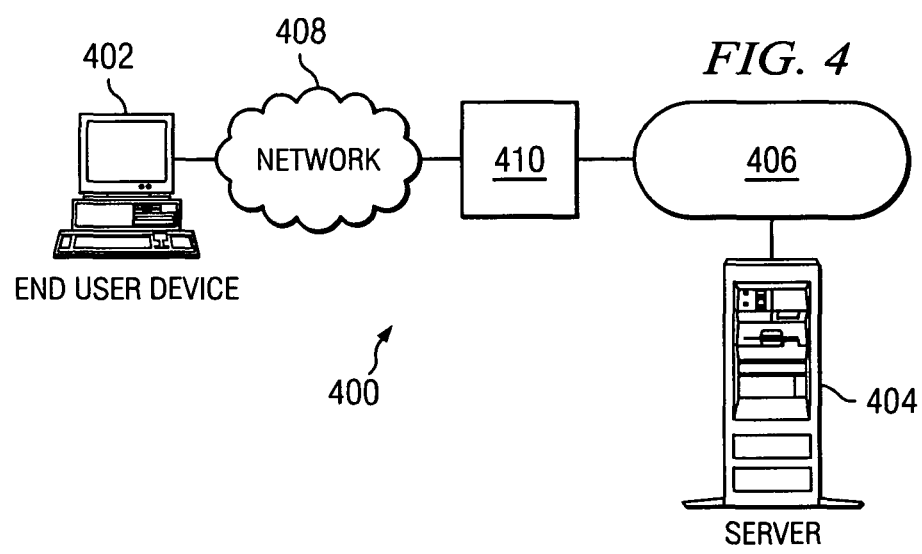
FIG. 4 depicts an environment where a user accesses computer resources from outside the confines of an employer's physical place of business.

Turning now to FIG. 4, there is shown an example of a user accessing computer resources from outside the confines of his/her employer's physical place of business—which is a relatively insecure environment. As shown at 400, an end user (not shown) operates an end user device 402 to access resources provided by server 404. A network 406, such as a local area network (LAN), is used to interconnect the server 404 to an outside network 408 by way of network interface 410, such as a router, modem, or gateway interface, which connects the private LAN 406 to an outside network 408 such as the internet. The end user device connects to the external internet 408 using traditional communication techniques such as a modem (dial-up, DSL or cable). This environment is relatively unsafe from malicious hacking into the network 408 by would-be outside intruders as it is a publicly accessible network. In this type of environment, where an external internet is used to gain access to requested resources, the password expire period can be set to be a relatively short period of time with respect to other user-access environments that only use an internal network.

Turning now to FIG. 5, there is shown at 500 a flow diagram for modifying the password expiration period for a user based upon the user's physical location when accessing a networked resource such as a server computer system (e.g. server 104, 304 or 404 shown, respectively, in FIGS. 1, 3 and 4). Processing begins at 502 and continues to 504 where a request for resource access by an end-user is received. From the request, a determination is made as to who the particular user is that is requesting access to the resource. In addition, a determination is made (using a utility such as traceroute previously described) as to where the user is physically attached to the network by identifying the IP address of the user device that the user is using to access the network. Then, at step 506 a determination is made as to whether the user is attempting to access the requested resource locally within the confines of their employer's physical place of business. For example, if the subnet portion of the identified IP address matches the subnet address for the requested resource, the user and requested resource are connected to the same, local subnet. If so, nothing further needs to be done with respect to password expiration modification, and processing ends at 518. If the user is not attempting to access the resource using a local IP address, a determination is made at 508 as to whether the user is attempting to access the requested resource from a known location such as their home or remote office. Such a determination can be based on statistically analysis of past access attempts, where the same IP address has previously been identified as being from the user's home or remote office. If this is a known IP address such as that of the user's home or remote office which is a medium security environment, a determination is made at 510 as to whether the password expiration period has already been modified to account for this medium security environment. If it has, no further processing is required and processing of the password expiration modification routine ends at 518. If it has not, then the password expiration period is modified at 512 to conform to this medium security environment, such that the previous password expiration period of X is modified to be $X'=X-Y$, with Y being a period of time commensurate with this medium security environment. For example, a normal password expire time of ninety (90) days may be decreased to only be thirty (30) days, so in this instance X is ninety (90) and Y is sixty (60) such that the new password expire period $X'=X-Y=90-60=30$. Processing then ends at 518. Returning back to block 508, if the user is not attempting to access the resource using a known IP address, the user must be accessing the network using an unknown (or infrequently used) IP address, so it is assumed the user is attempting to access the resource from a high risk, remote location. This is an example of using deviations/variances from previously detected usage patterns of a user accessing a network to selectively adjust the password expiration period. A determination is made at 514 as to whether the password expiration period has already been modified to account for this high risk security environment. If it has, no further processing is required and processing of the password expiration modification routine ends at 518. If it has not, then the password expiration period is modified at 516 to conform to this high risk security environment, such that the previous password expiration period of X is modified to be $X'=X-(Y+Z)$, with Z being a period of time commensurate with this high risk security environment. For example, a normal password expire time of ninety (90) days may be decreased to only be ten (10) days, so in this instance X is ninety (90), Y is sixty (60) and Z twenty (20), such that the new password expire period $X'=X-(Y+Z)=90-(60+20)=10$. Processing then ends at 518.

Thus, there has been described a technique for dynamically modifying the password expiration time period for a given user based upon patterns of network access, and deviations from such patterns of network access, so that the period of time transpires before a user is mandated to change their password is reduced, and this reduction in time is reduced based on the perceived security risk associated with the network access.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. For example, these password expiration modification techniques could be used in a banking environment, where a user accesses their bank account from a home computer and a remote ATM machine. The remote ATM machine may be connected to the financial institution using a dedicated, private network. Alternatively, or in addition, ATM machines that can be used by the user are connected to the financial institution using a public network. In this scenario, the dedicated, private network would be the low risk environment, the user's access from their home computer would be the medium risk environment, and the user's access from an ATM terminal connected to the financial institution by way of a public network would be the high risk environment, with password expiration periods for the user being modified according to their particular technique for accessing the financial institution.

What is claimed is:

1. A method for adjusting an expiration time for a password that is used to access a password-protected network resource from a device coupled to the network, comprising:
   receiving a request from the device to access the network resource using the password;
   responsive to receiving the request, determining that the expiration time for the password is not sufficient to account for a new password compromise risk based upon an environment associated with the device,
      wherein the new password compromise risk is greater than a previous password compromise risk associated with a previous request to access the network resource using the password;
      wherein the previous request resulted in granting access to the network resource;
      wherein the environment is one of a medium security environment and a high risk security environment associated with the new password compromise risk and the previous password compromise risk is associated with a secure environment;
      wherein the secure environment is a physical place of business and the high risk security environment is outside the physical place of business;
      wherein the medium security environment is related to a known IP address and the high risk security environment is related to an unknown IP address; and
   responsive to determining that the expiration time for the password is not sufficient to account for the new password compromise risk, decreasing the expiration time for the password in proportion to a change between the secure environment and the environment,
      wherein the change in the expiration time is based upon a difference between the new password compromise risk and the previous password compromise risk.

2. The method of claim 1, further comprising:
   determining a network address for the device; and
   determining the new password compromise risk based upon the network address for the device.

3. The method of claim 2, wherein the network address comprises a subnet portion and a device portion, and further comprising:
   determining whether the device is attached to a same subnet as the requested network resource and if not, comparing the network address with a previous network address used by the device during a previous access of the network resource; and
   if the network address and the previous network address are the same, decreasing the expiration time for the password by a relatively small amount of time, and if the network address and the previous network address are not the same, decreasing the expiration time for the password by a relatively large amount of time.

4. The method of claim 1, wherein a network route is traced between the device and the network resource to determine the new password compromise risk.

5. The method of claim 4, wherein the expiration time is decreased if the new password compromise risk is deemed to be relatively high due to the traced network route indicating use of at least a portion of a public-accessible network.

6. The method of claim 1, wherein the expiration time is adjusted based upon both actual usage patterns of a user in accessing the network resource and deviations from the actual usage patterns.

7. A system for adjusting an expiration time for a password that is used to access a password-protected network resource from a device coupled to a network, comprising:
   a bus;
   a communications unit connected to the bus;
   a memory connected to the bus, wherein the memory includes a set of computer usable program code; and
   a processor unit connected to the bus, wherein the processor unit executes the set of computer usable program code to:
   receive a request from the device to access the network resource using the password;
   responsive to receiving the request, determine that the expiration time for the password is not sufficient to account for a new password compromise risk based upon an environment associated with the device,
      wherein the new password compromise risk is greater than a previous password compromise risk associated with a previous request to access the network resource using the password;
      wherein the previous request resulted in granting access to the network resource;
      wherein the environment is one of a medium security environment and a high risk security environment associated with the new password compromise risk and the previous password compromise risk is associated with a secure environment;
      wherein the secure environment is a physical place of business and the high risk security environment is outside the physical place of business;
      wherein the medium security environment is related to a known IP address and the high risk security environment is related to an unknown IP address; and
   responsive to determining that the expiration time for the password is not sufficient to account for the new password compromise risk, decreasing the expiration time for the password in proportion to a change between the secure environment and the environment,
      wherein the change in the expiration time is based upon a difference between the new password compromise risk and the previous password compromise risk.

8. The system of claim 7, wherein the processor unit further executes the set of computer usable program code to:
   determine a network address for the device; and
   determine the new password compromise risk based upon the network address for the device.

9. The system of claim 8, wherein the network address comprises a subnet portion and a device portion, and wherein the processor unit further executes the set of computer usable program code to:
   determine whether the device is attached to a same subnet as the requested network resource and if not, comparing the network address with a previous network address used by the device during a previous access of the network resource;
   decrease the expiration time for the password by a relatively small amount of time if the network address and the previous network address are the same; and
   decrease the expiration time for the password by a relatively large amount of time if the network address and the previous network address are not the same.

10. The system of claim 7, wherein the processor unit further executes the set of computer usable program code to:
    trace a network route between the device and the network resource to determine the new password compromise risk; and
    decrease the expiration time if the new password compromise risk is deemed to be relatively high due to the traced network route indicating use of at least a portion of a public-accessible network.

11. The system of claim 7, wherein the expiration time is adjusted based upon both actual usage patterns of a user in accessing the network resource and deviations from the actual usage patterns.

12. A computer program product embodied in a non-transitory computer-readable storage medium with computer executable instructions encoded thereon for adjusting an expiration time for a password that is used to access a password-protected network resource from a device coupled to a network, comprising:
    first instructions for receiving a request from the device to access the network resource using the password; and
    second instructions for, responsive to receiving the request, determining that the expiration time for the password is not sufficient to account for a new password compromise risk based upon an environment associated with the device,
       wherein the new password compromise risk is greater than a previous password compromise risk associated with a previous request to access the network resource using the password;
       wherein the previous request resulted in granting access to the network resource;
       wherein the environment is one of a medium security environment and a high risk security environment associated with the new password compromise risk and the previous password compromise risk is associated with a secure environment;
       wherein the secure environment is a physical place of business and the high risk security environment is outside the physical place of business;
       wherein the medium security environment is related to a known IP address and the high risk security environment is related to an unknown IP address; and
    third instructions for, responsive to determining that the expiration time for the password is not sufficient to account for the new password compromise risk, decreasing the expiration time for the password in proportion to a change between the secure environment and the environment,
       wherein the change in the expiration time is based upon a difference between the new password compromise risk and the previous password compromise risk.

13. The computer program product of claim 12, further comprising:
    fourth instructions for determining a network address for the device; and
    fifth instructions for determining the new password compromise risk based upon the network address for the device.

14. The computer program product of claim 13, wherein the network address comprises a subnet portion and a device portion, and further comprising:
    sixth instructions for determining whether the device is attached to a same subnet as the requested network resource and if not, comparing the network address with a previous network address used by the device during a previous access of the network resource;
    seventh instructions for decreasing the expiration time for the password by a relatively small amount of time if the network address and the previous network address are the same; and
    eighth instructions for decreasing the expiration time for the password by a relatively large amount of time if the network address and the previous network address are not the same.

15. The computer program product of claim 12, further comprising:
    instructions for tracing a network route between the device and the network resource to determine the new password compromise risk; and
    instructions for decreasing the expiration time if the new password compromise risk is deemed to be relatively high due to the traced network route indicating use of at least a portion of a public-accessible network.

16. The computer program product of claim 12, wherein the expiration time is adjusted based upon both actual usage patterns of a user in accessing the network resource and deviations from the actual usage patterns.

17. A method for dynamically adjusting a password expiration period for a password, comprising:
    in response to receiving a request to access a password-protected device using the password, determining that the expiration period for the password is not sufficient to account for a new password compromise risk based upon an environment associated with the device,
       wherein the new password compromise risk is associated with access patterns of a user requesting access to the password protected device using the password;
       wherein the new password compromise risk is greater than a previous password compromise risk associated with a previous request to access a network resource using the password;
       wherein the previous request resulted in granting access to the network resource;
       wherein the environment is one of a medium security environment and a high risk security environment associated with the new password compromise risk and the previous password compromise risk is associated with a secure environment;
       wherein the secure environment is a physical place of business and the high risk security environment is outside the physical place of business;

wherein the medium security environment is related to a known IP address and the high risk security environment is related to an unknown IP address; and responsive to determining that the expiration period for the password is not sufficient to account for the new password compromise risk, decreasing the expiration period for the password in proportion to a change between the secure environment and the environment, wherein the change in risk the expiration period is based upon a difference between the new password compromise risk and the previous password compromise risk.

18. The method of claim 17, wherein the password-protected device is coupled to a network, and wherein the password-protected device is accessed by the user using a network-coupled device that is coupled to the network, and wherein a network address for the network-coupled device is used to quantify an amount of time for adjusting the password expiration period.

19. The method of claim 18, wherein the network address is compared with an address of the password-protected device to quantify the amount of time for adjusting the password expiration period.

20. The method of claim 19, wherein both the network address and the address of the password-protected device comprise a subnet portion, and the password expiration period is decreased if the subnet portion for the network address and the address of the password-protected device are not equivalent and the password expiration period has not previously been decreased from a default expiration period for the password-protected device.

* * * * *